(12) United States Patent
Goodsmith et al.

(10) Patent No.: US 6,631,827 B2
(45) Date of Patent: Oct. 14, 2003

(54) FASTENER FEED AND INSTALLATION HEAD

(75) Inventors: Dale H. Goodsmith, Brighton, MI (US); Harold A. Ladouceur, Livonia, MI (US); John J. Vrana, Rochester Hills, MI (US); David W. Sickels, Plymouth, MI (US)

(73) Assignee: FabriSteel Products, Inc., Taylor, MI (US)

( * ) Notice: Subject to any disclaimer, the term of this patent is extended or adjusted under 35 U.S.C. 154(b) by 5 days.

(21) Appl. No.: 10/138,446

(22) Filed: May 3, 2002

(65) Prior Publication Data

US 2003/0164381 A1 Sep. 4, 2003

Related U.S. Application Data

(60) Provisional application No. 60/360,933, filed on Mar. 1, 2002.

(51) Int. Cl.[7] .................................................. B65H 5/00
(52) U.S. Cl. ........................ 221/238; 221/239; 221/251; 221/270
(58) Field of Search .................................. 221/238, 239, 221/251, 258, 267, 268, 270, 273; 227/100, 102, 107, 136, 138; 29/798, 809

(56) References Cited

U.S. PATENT DOCUMENTS

| | | | | |
|---|---|---|---|---|
| 3,042,255 A | * | 7/1962 | Halbreich |
| 3,089,360 A | * | 5/1963 | Steward |
| 3,098,576 A | * | 7/1963 | Steward |
| 3,108,368 A | * | 10/1963 | Steward |
| 3,774,284 A | * | 11/1973 | Cootes |
| 3,810,290 A | * | 5/1974 | Grube |
| 3,811,171 A | * | 5/1974 | Grube |
| 3,845,860 A | * | 11/1974 | Ladouceur et al. |
| 3,877,133 A | * | 4/1975 | Grube |
| 3,942,235 A | * | 3/1976 | Goodsmith et al. |
| 3,946,478 A | * | 3/1976 | Goodsmith et al. |
| 3,946,479 A | * | 3/1976 | Goodsmith et al. |
| 3,961,408 A | * | 6/1976 | Goodsmith et al. |
| 4,203,187 A | * | 5/1980 | Grube |
| 4,454,650 A | * | 6/1984 | Silver |
| 4,574,453 A | * | 3/1986 | Sawdon |
| 4,698,905 A | * | 10/1987 | Taga |
| 4,785,529 A | * | 11/1988 | Pamer et al. |
| 5,636,426 A | * | 6/1997 | Luckhardt et al. |
| 5,743,003 A | * | 4/1998 | Shinjo |
| 5,953,813 A | * | 9/1999 | Sickels et al. |
| 6,018,863 A | * | 2/2000 | Altrock |
| 6,263,561 B1 | * | 7/2001 | Sickels et al. |
| 6,295,710 B1 | * | 10/2001 | Roberts et al. |

OTHER PUBLICATIONS

Pierce Nut Installation Tooling Brochure.*
Multipierce/Multimatic Bench Manual.*

* cited by examiner

Primary Examiner—David H. Bollinger
(74) Attorney, Agent, or Firm—Howard & Howard

(57) ABSTRACT

A self-attaching fastener installation head and feed mechanism including a spring-biased L-shaped feed pawl which feeds a first nut in the feed passage adjacent the plunger passage on the upstroke of the die press. The feed pawl is pivotally supported on a slide bracket which includes a roller in the longitudinal axis of the feed passage which is biased against a central cam surface on the base and the base is interconnected to the nose member by removable pins. A spring biased nut restrictor is pivotally supported on the nose member, simplifying removal of a nut strip from the head and the installation head is more rugged in design and has fewer parts, reducing costs.

39 Claims, 6 Drawing Sheets

FASTENER FEED AND INSTALLATION HEAD

RELATED APPLICATION

This application claims priority from the provisional application Ser. No. 60/360,933, filed Mar. 1, 2002.

The present invention relates to improvements in pierce and clinch nut installation heads of the type disclosed in U.S. Pat. No. 3,089,360 of Multifastener Corporation, the predecessor in interest of the assignee of this application. As disclosed in U.S. Pat. No. 3,089,360, the disclosure which is incorporated herein by reference, pierce and clinch nut installation heads, are typically attached to the upper die shoe or platen of a die press and the installation head simultaneously feeds the pierce or clinch nuts, either in strip or bulk form, to a plunger and installs a pierce or clinch nut through the plunger passage into a metal panel and a die button located in the opposite die shoe or platen permanently installs the nut in the panel. As will be understood by those skilled in this art, the installation head may alternatively be installed in the lower die shoe and the die button may be in the upper die shoe.

A conventional pierce nut installation head, as disclosed in U.S. Pat. No. 3,089,360, for example, includes a base portion, which is generally attached to the upper die shoe, a shank or guidepost, which extends generally perpendicular to the upper die shoe, and a plunger fixed to the base and therefore extends from the upper die shoe. The pierce nut installation head generally further includes a nose member having a plunger passage and a transverse feed passage which receives pierce or clinch nuts for installation in a panel. The nuts are fed to the plunger passage by a feed mechanism and installed by the plunger with each stroke of the die press.

Although the pierce nut installation head disclosed in the above-referenced U.S. patent has been used successfully to install pierce nuts for many years, it would be desirable to simplify the design to reduce the required number of parts and thereby reduce cost, reduce the required size of the pierce nut installation head to increase the number of applications where the pierce nut head may be utilized, improve the feed system by providing a spring-biased pawl which feeds the "first nut" adjacent the plunger passage to the plunger passage to reduce feeding error and provide a pierce nut installation head which may be utilized to feed and install various types of pierce nuts having common elements or components. These and other advantages are provided by the pierce nut installation head of this invention.

Various attempts have been made to solve the problems associated with the pierce nut installation head described in the above-referenced U.S. patent. For example, a "positive feed" pierce nut installation head is disclosed in U.S. Pat. No. 3,961,408, also assigned to Multifastener Corporation, wherein the feed pawl engages the bore of the pierce nut adjacent the plunger passage during feeding. However, the pierce nut installation head disclosed in this patent was withdrawn by Multifastener Corporation because of problems associated with the positive feed system disclosed in this patent as described below. Thus, it would be desirable to utilize a feed pawl in a pierce nut installation head, wherein the pawl is spring biased to feed the pierce nuts to the plunger passage as the die press is opened as disclosed in the above-referenced U.S. Pat. No. 3,089,360, but wherein the pawl feeds the nut adjacent the plunger passage as described.

Further, U.S. Pat. Nos. 5,636,426, 5,953,813 and 6,263,561 disclose various improvements in retaining the pierce nuts in the plunger passage during movement of the pierce nut through the plunger passage. It would also be desirable to improve the fastener retaining mechanism disclosed in these patents.

SUMMARY OF THE INVENTION

The present invention relates to an installation apparatus for installing self-attaching fasteners, particularly including pierce and clinch nuts, a feed mechanism for an installation head for feeding self-attaching fasteners interconnected by a frangible connector, and a method of installing a self-attaching fastener in a panel, wherein the feed mechanism includes a spring-biased feed pawl which feeds the first self-attaching fastener in the feed passage adjacent the plunger passage upon opening of the die press, thereby avoiding problems associated with the installation heads presently on the market. As set forth above, the installation apparatus of this invention includes a base member, which is conventionally attached to the upper shoe of a die press, having a plunger fixed relative to the base member and extending from the base member, a nose member spaced from the base member by a biasing element, such as a spring or pneumatic cylinder, wherein the nose member includes a feed passage and a plunger passage which receives the free end of the plunger, and a feed mechanism which feeds self-attaching fasteners through the feed passage into the plunger passage for installation in a panel located opposite the plunger passage.

The feed mechanism of this invention is particularly, but not exclusively adapted to feed self-attaching fasteners interconnected by a frangible connector, such as disclosed in the above-referenced U.S. Pat. No. 3,845,860. The feed mechanism of this invention includes at least one spring biased feed pawl having an end portion which engages the self-attaching fastener or nut in the feed passage adjacent the plunger passage, which is sometimes referred to herein as the "first fastener" or the "first nut," but which is actually the last nut in the feed passage, and drives the first fastener adjacent the plunger passage into the plunger passage for installation by the plunger upon opening of the die press. The feed mechanism and method of installation of this invention eliminates several problems associated with the prior installation apparatus. First, the feeding of the first nut in the feed passage adjacent the plunger passage eliminates the problem of misfeeding the self-attaching nuts due to tolerance buildup, particularly where the fasteners are interconnected by a frangible connector element. The fastener installation head disclosed in U.S. Pat. No. 3,942,235, etc. attempted to solve this problem by feeding the first nut in the feed passage adjacent the plunger passage. However, the fastener installation head disclosed in these patents was not successful because the feed pawl was connected to the base member by a linkage, wherein the feed pawl was positively actuated by the linkage upon closing of the die press resulting in breakage of the linkage due to tolerance variations, such that the travel of the feed pawl was not properly controlled.

The preferred embodiment of the feed mechanism of this invention includes a bracket or slide which is movable toward and away from the plunger passage and a feed pawl is pivotally supported on the bracket. A spring biases the bracket toward the plunger passage and a roller is rotatably supported on the bracket opposite an inclined cam surface on the base member. Thus, upon closing of the die press, the roller engages the cam surface, moving the bracket away from the plunger passage. Then, upon opening of the die press, the bracket is urged by the spring toward the plunger passage and the feed pawl then feeds the first nut adjacent the plunger passage into the plunger passage for installation during the next stroke of the press. In the most preferred embodiment, the feed pawl is L-shaped including a first leg portion extending into the feed passage and a second generally transverse leg. A second spring is biased against the transverse leg of the feed pawl, rotating the feed pawl to engage the first nut adjacent the plunger passage. The bracket or slide includes a base portion slidably supported in the feed passage and a transverse bracket portion, and the roller is rotatably supported on the bracket portion of the slide.

In the disclosed embodiment of the feed mechanism of this invention, the feed pawl includes a finger adapted to be received in the nut bore of the first nut in the feed passage adjacent the plunger passage. Where only one nut remains in the feed passage, the end of the feed pawl engages the side of the last nut. However, the feed mechanism of this invention may also be utilized to feed a fastener strip having notches or projections on the exposed sides of the fasteners in the fastener strip as disclosed in a co-pending application assigned to the assignee of this application, wherein two feed pawls are pivotally supported on the slide bracket, thereby eliminating contact with the feed bore and also permitting feeding of fastener elements which do not have a bore or where it is not practical to feed the bore of the fastener. Further, where the feed system of this invention includes two feed pawls which engage notches or projections on the sides of the fasteners, it is possible to use a spring having a greater force which would otherwise damage the nut bore assuring feeding of the fasteners and permitting engagement of a fastener adjacent the plunger passage, but spaced from the plunger passage one or two fasteners thus reducing the likelihood of feed error.

Other problems associated with the present fastener installation heads of the type disclosed herein relate primarily to maintenance. One problem, for example, relates to disassembly of the pierce nut installation head. During service of the head, the nose member must be disassembled from the base member. This is a difficult task with the present fastener installation heads. However, in the fastener installation head of this invention, the nose member is attached to the base member by a shank and the shank is attached to the nose member by removable pins. In the most preferred embodiment, the free end of the shank is rectangular and the nose member includes a rectangular opening which receives the free end of the shank, and the nose member is then retained to the shank by removable pins received through the rectangular free end portion of the shank.

Another problem relates to removal of a nut strip from the installation head such as disclosed in the above-referenced U.S. Pat. No. 3,845,860. As will be understood by those skilled in this art, the pierce nuts may be fed to the feed passage from a spool of nuts and the spool of nuts must be changed periodically by the die press operator. Thus, it would be convenient to be able to remove a small portion of a strip of nuts from the head prior to complete exhaustion of the spool. This is presently a difficult task primarily because of the design of the restrictor, which is a metal stamping. The release of the nut strip also requires a special tool. In the fastener installation head of this invention, the restrictor comprises a metal part, preferably a cast metal part, pivotally supported on the nose member, having a finger which extends into the first nut bore of the first nut adjacent the plunger passage. The finger is biased by a spring into the nut bore. The second leg of the feed pawl also includes a projecting portion which may be easily gripped by the operator. The nut strip may thus be easily removed from the fastener installation head simply by depressing the nut restrictor and the second leg portion of the feed pawl, releasing the nut strip and permitting removal of the nut strip from the fastener installation head.

Other advantages and meritorious features of the fastener installation head, feed mechanism and method of feeding and installing a self-attaching fastener will be more fully understood from the following description of the preferred embodiments, the appended claims and the drawings, a brief description of which follows. As will be understood, the embodiments of the fastener installation head and feed mechanism of this invention described below are exemplary only and various modifications may be made within the purview of the appended claims.

BRIEF DESCRIPTION OF THE DRAWINGS

FIG. 1A is a partial side cross-sectional view illustrating an alternative embodiment of the fastener installation head shown in FIG. 1 utilizing a coil spring, rather than a pneumatic piston;

DESCRIPTION OF PREFERRED EMBODIMENTS

Figure 1:
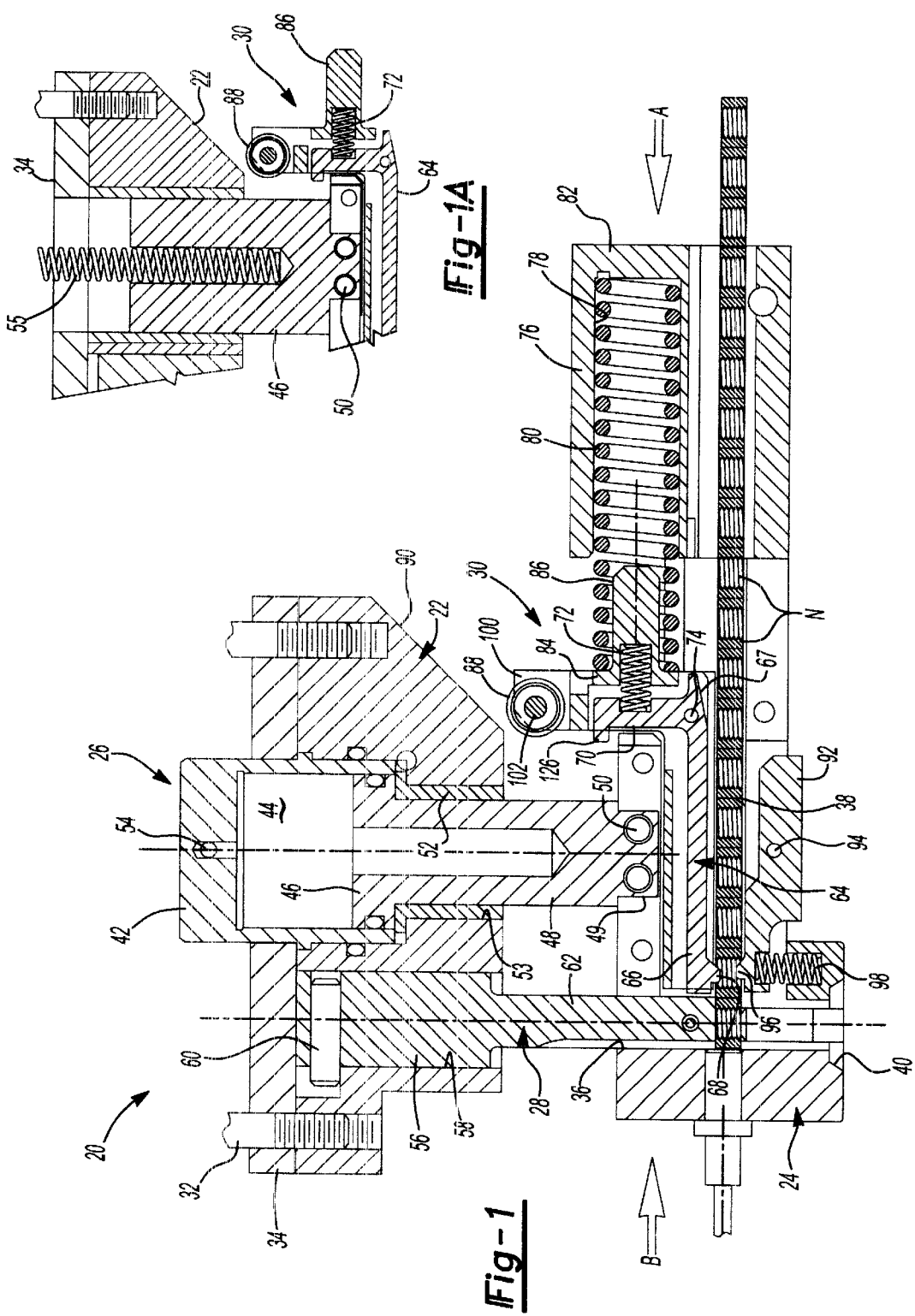
FIG. 1 is a side cross-sectional view of one embodiment of the fastener installation head of this invention in the open position.

The embodiment of the fastener installation head 20 of this invention illustrated in FIG. 1 includes a base member 22, a nose member 24, a shank or guidepost assembly 26, a plunger 28 and a nut feed assembly 30. As set forth above, the base member 22 is generally attached to the upper die shoe or platen of a die press (not shown) by mounting bolts 32. In a typical application, a mounting or back-up plate 34 is provided between the base member 22 and the upper die platen (not shown). Shims (not shown) may also be provided between the mounting plate 34 and the upper die platen.

The nose member 24 includes a plunger passage 36 and a transverse nut feed passage 38 which receives the fasteners, such as nuts "N," from the feed mechanism 30 as described below. The plunger passage 36 may also include an explosion relief 40 which avoids jamming of the plunger passage if the die press is operated to install a second nut over a nut already installed in the panel as will be understood by those skilled in this art.

The shank or post assembly 26 in the embodiment shown in FIG. 1 includes a pneumatic piston housing 42 including a cylindrical piston chamber 44, a pneumatic piston 46 reciprocable in the piston chamber 44 having a shank portion 48 attached to the nose member 24 by any suitable means, but in the preferred embodiment, by removable pins 50. In the preferred embodiment, the shank portion 48 is cylindrical and end 49 is rectangular, received in a rectangular opening in the nose member 24 and retained by removable pins 50, permitting easy removal of the nose member 24 from the base member 22, simplifying the design and making it more robust and reducing cost. The base member 22 also includes a bore 53 which receives a suitable sleeve 52. The piston chamber 44 is maintained under pneumatic pressure through pneumatic port 54, normally separating the nose member 24 from the base member 22 as shown in FIG. 1. Alternatively, a coil spring 55 may be compressed between the upper die shoe (not shown) and the piston 46 as shown in FIG. 1A.

The plunger 28 includes a base portion 56 which is received in a bore 58 in the base member 22 and is secured to the base member 22 by a suitable locking pin 60 as shown in FIG. 1. As shown in FIG. 1, the base portion 56 abuts the mounting plate 34, such that the plunger is fixed relative to the upper die shoe of a die press (not shown). The plunger 28 also includes a shank portion 62 which is telescopically received through the plunger passage 36 of the nose member 24 during installation of a pierce or clinch nut as described below.

The nut feed assembly 30 includes a unique L-shaped feed pawl 64 including a first leg portion 66 which extends generally parallel to the nut passage 38 of the nose member 24 having a finger 68 which is received in the bore of the nut "N" adjacent the plunger passage 36 during feeding of a nut into the plunger passage 38. As described below, the pawl 64 includes a generally transverse second. leg portion 70, which is biased by a coil spring 72 to rotate the L-shaped feed pawl 64, and the feed pawl 64 is pivotally supported on a bracket or slide member 100 by a pivot pin 74. The coil spring 72 thus resiliently rotates the feed pawl about pivot pin 64 counter-clockwise in FIG. 1 to receive the finger 68 in the bore of a nut "N." The chute member or block 76 includes a blind opening or passage 78 and a coil spring 80 is biased between the end wall 82 of the chute member 76 and the head 84 of plunger 86 which is integrally formed with the bracket 100 as described below. The L-shaped feed pawl 64 further includes a finger 67 at the intersection at the legs 66 and 70 which extends generally parallel to the leg 66 or generally perpendicular to the leg 70 which engages the bracket 100 and limits rotation of the leg 66 into the bore of the nut "N," particularly where a nut is not located in the feed passage 38. As described below, the unique feed assembly 30 of this invention assures proper feeding of the nut "N" into the plunger passage 36 during opening of the die press (not shown).

The feed assembly 30 further includes a roller 88 which, during actuation of the pierce nut installation head 20, is biased against the inclined cam surface 90. on the base member 22. The feed assembly further includes a pivotal restrictor 92 which is pivotally supported on the nose member 24 by a pivot pin 94 having a finger 96 which is biased by spring 98 to receive the finger 96 into the bore of the nut end adjacent the plunger passage 36. The restrictor 92 thus prevents retraction of a nut strip from its position adjacent the plunger passage 36 following each stroke of the die press as further described below.

Figures 3, 4:
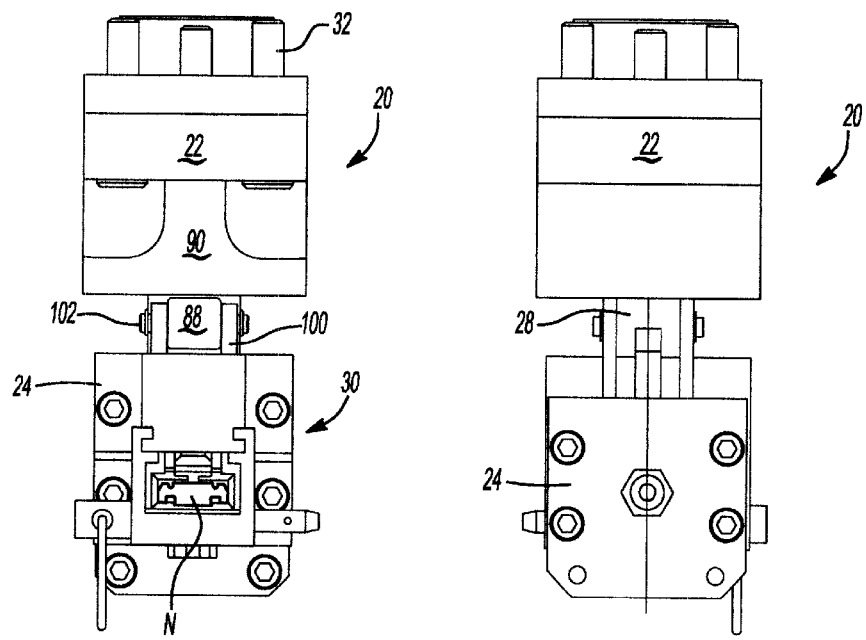
FIG. 3 is a rear end view of the fastener installation head shown in FIG. 1 in the direction of view arrow A.
FIG. 4 is an end view of the fastener installation head shown in FIG. 1 in the direction of view arrow B.

As shown in FIG. 3, the roller 88 is supported by bracket 100 and is rotatably supported on pin 102 in the central longitudinal axis of the pierce nut installation head 20 which is coincident with the feed passage 38. This not only simplifies the design, reduces the number of parts and reduces the width of the head, as compared to the prior art, but also results in a more robust design. In the pierce nut installation head disclosed in the above referenced U.S. Pat. No. 3,089,360, the present pierce nut installation head includes a pair of spaced cam members or ears 38, each having an inclined cam surface 40 which are attached to the base member either by bolts 42 or by welding. The feed assembly includes a pair of spaced rollers 146 which engage the spaced cam surfaces 40 of the cam members 38. The pierce nut installation head 20 of this invention includes a single cam surface 90 which, in the preferred embodiment, is T-shaped as shown in FIG. 3 to accommodate the mounting bolts 32 shown in FIG. 1.

Figure 6:
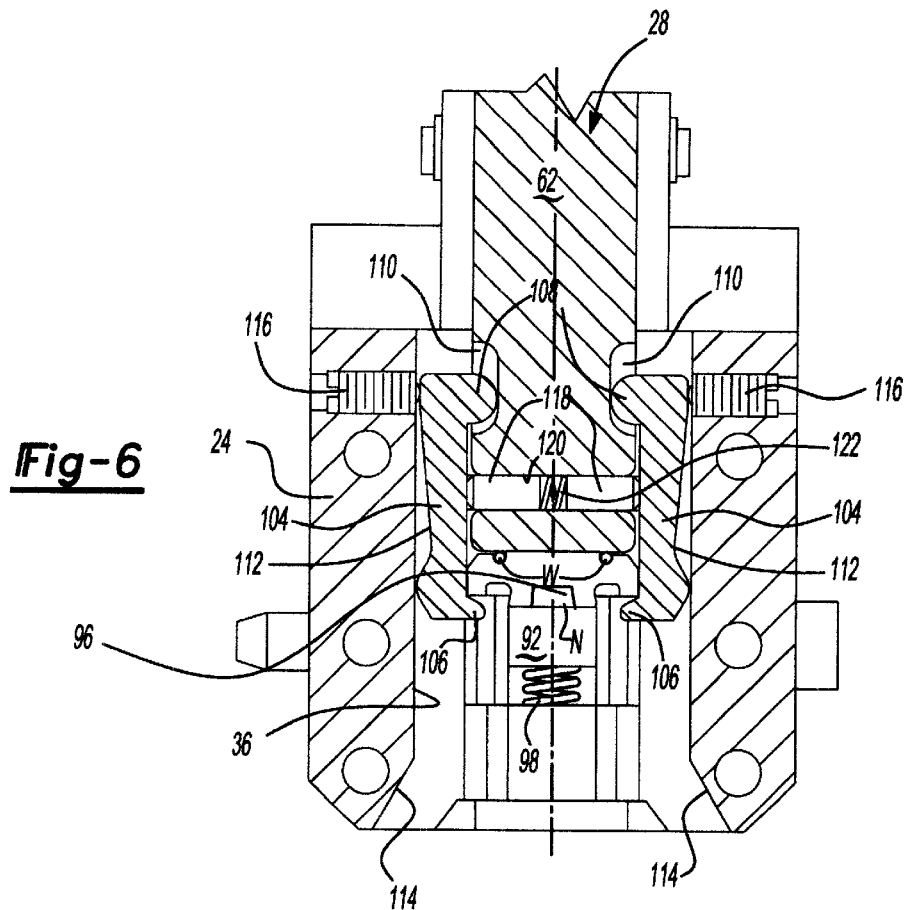
FIG. 6 is an end cross-sectional view of the nose and plunger assembly illustrating a preferred embodiment of the nut retention mechanism.
Figure 6A:
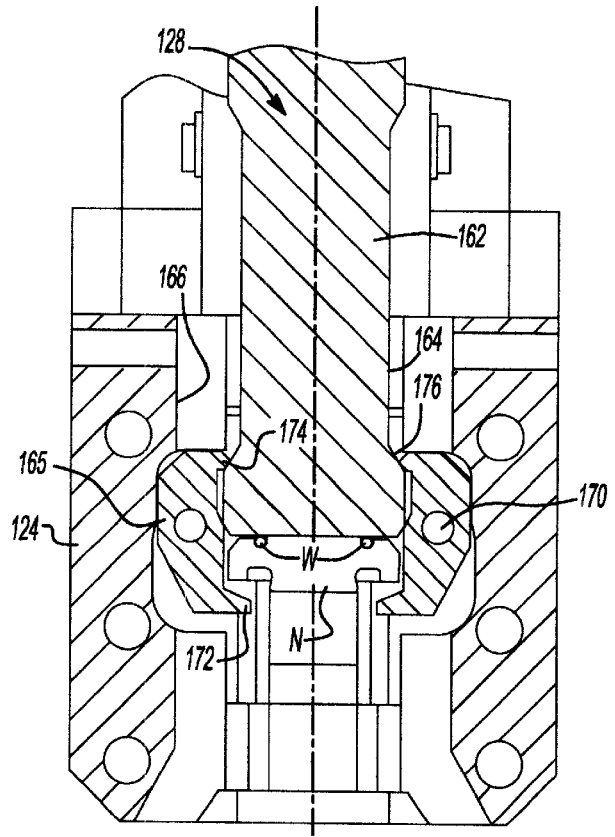
FIG. 6A is an end cross-sectional view similar to FIG. 6, illustrating an alternative embodiment of the nut retention mechanism.

As described, pierce nuts "N" are fed to the chute block 76 either in bulk form or in a strip, wherein the pierce nuts are interconnected by frangible connector elements "W," such as wires, as disclosed in U.S. Pat. No. 3,845,860. Where the pierce nuts are fed in bulk form, a chute is attached to the chute block 76 and the nuts are fed from a hopper (not shown) to the installation head through a flexible chute and the nuts are fed to the plunger passage 36 by gravity. Alternatively, the bulk nuts may be fed into the feed passage 36 by a "pusher" similar to the nut feed mechanism 30 disclosed in this application or as is known in the prior art. When the upper die shoe (not shown) is moved toward the lower die shoe in the die press (i.e., the die press is "closed"), the nose 24 engages a panel (not shown) to which the nut "N" is to be attached on the lower die shoe. The plunger 28 then engages the pierce nut "N" and the pierce nut is then driven through the plunger passage 36 to engage and install the nut in a metal panel. As will be understood by those skilled in this art, the panel is supported on a die button (not shown), which deforms the panel into recesses or grooves or the nut is deformed to permanently affix the nut to the panel. Pierce nuts generally include a projecting pilot portion which pierces its own hole in the panel, such that a pierce nut is installed in a panel with each stroke of the press as described in several prior patents of the Multifastener Corporation, the predecessor in interest of the assignee of this application. FIGS. 6 and 6A illustrate alternative embodiments of nut retainer mechanisms which may be utilized with the pierce nut installation head of this invention, wherein the nut retainer mechanism disclosed in FIG. 6A is generally conventional.

Figure 2:
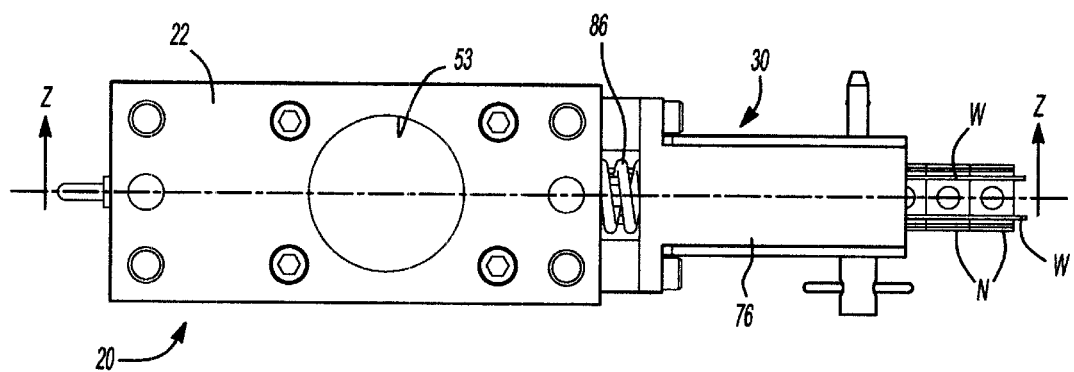
FIG. 2 is a partial top elevation of the fastener installation head without the mounting plate.
Figures 8, 9:
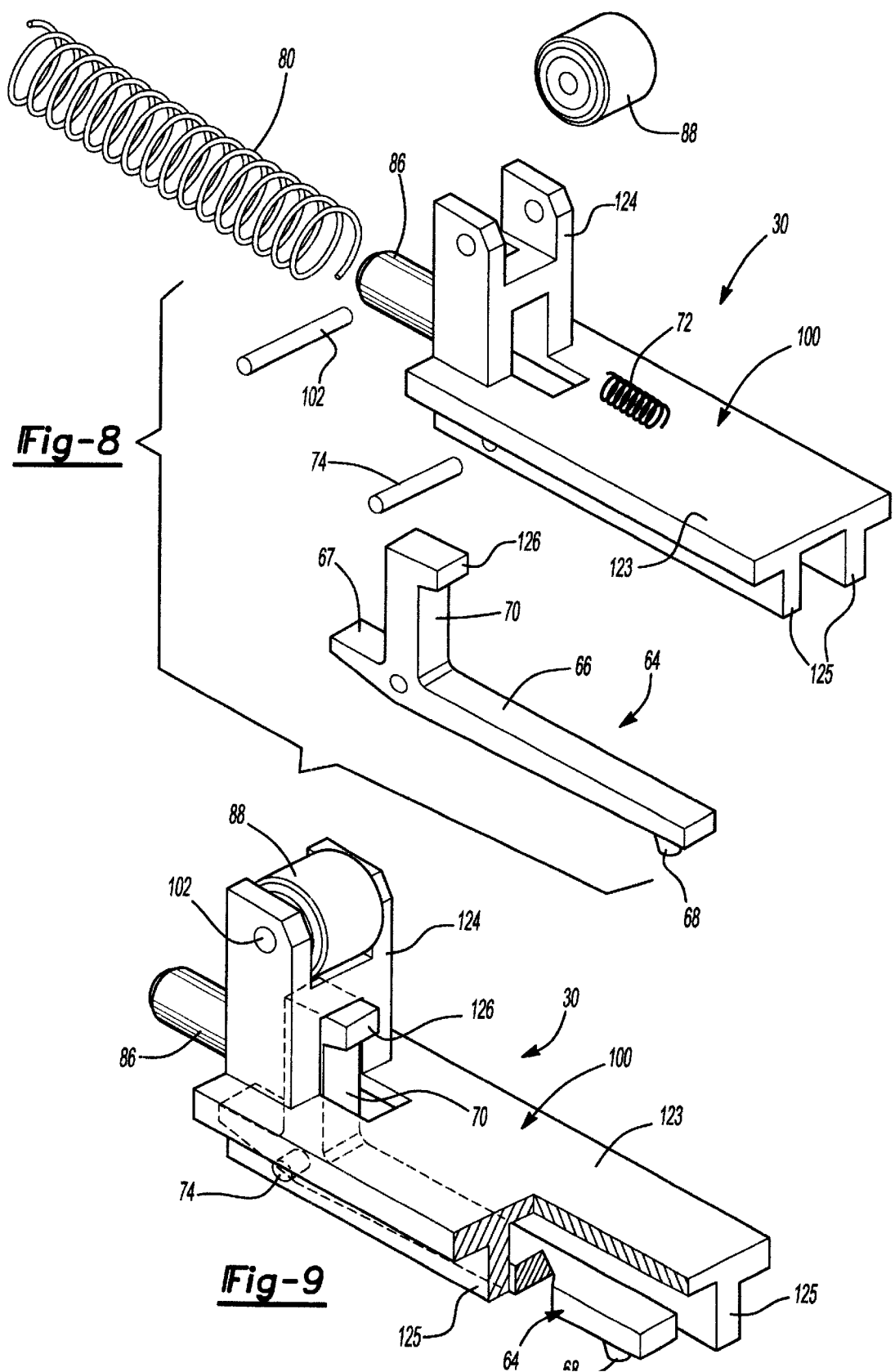
FIG. 8 is an exploded view of a preferred embodiment of the feed mechanism of this invention illustrated in FIG. 1.
FIG. 9 is a partially cross-sectioned top elevation of the assembled feed mechanism illustrated in FIG. 8.

The preferred embodiment of the feed mechanism 30 of this invention is best shown in FIGS. 8 and 9, wherein FIG. 8 is an exploded view of the feed mechanism and FIG. 9 illustrates the feed mechanism assembly. As described above, the feed mechanism includes a bracket 100, an L-shaped feed pawl 64 which is pivotally supported on the bracket 100 by pivot pin 74 and a roller 88 rotatably supported on the bracket 100 by pin 102. In the preferred embodiment of the fastener feed mechanism, the bracket 100 includes a base portion 123 and an H-shaped bracket portion 124 which rotatably supports the roller 88. The base portion 123 includes rails 125 which slidably support the bracket 100 in the feed passage, such that the spring 80 normally biases the slide bracket 100 toward the plunger passage 38 shown in FIGS. 1 and 5. As set forth above, the feed mechanism 30 of this invention is particularly, but not exclusively, adapted to feed fasteners, such as nuts "N," wherein the fasteners are interconnected by frangible connector elements, such as the wires "W" disclosed in the above-referenced U.S. Pat. No. 3,845,860 and shown in FIG. 2. As will be understood by those skilled in this art, the interconnected nuts "N" are coiled on a reel and the free end of the nut strip is fed to the feed mechanism 30 through the feed passage 38. The nut strip is thus under tension and a substantial force is required to feed the nuts "N" through the feed passage 38 into the plunger passage 36. The feed mechanism accomplishes this requirement, but the feed pawl 64 also feeds the first nut in the feed passage to the plunger passage as further described herein.

In the embodiment of the nut retention mechanism in the plunger passage 38 shown in FIG. 6A, the plunger 128 includes a shank portion 162 including a lower end portion spaced immediately above the pierce nut "N" in the plunger passage 166 (36 in FIG. 1) and opposite the feed passage 38 shown in FIG. 1. The nut "N" illustrated in FIGS. 6 and 6A (and FIG. 3) is a conventional Hi-Stress® pierce nut available from the assignee of this application, Fabristeel Products, Inc. As set forth above, however, the pierce nut installation head 20 of this invention may be utilized with any conventional pierce nut including the "Universal" or "UP" pierce nut, self-clinching nuts, etc. Upon receipt of the pierce nut "N" in the plunger passage 36, the pierce nut "N" is retained by fingers 165 which are pivotally attached to the nose member 124 by pivot pins 170. The fingers 165 are generally U-shaped each including a lower hook-shaped portion 172, which receives and supports the pierce nut "N" in the plunger passage 36, and an upper hook-shaped portion 174 which is received against the shank portion 162 of the plunger 28. The disadvantage of the nut retention mechanism illustrated in FIG. 6A is the fact that the nut "N" is released upon movement of the plunger 28 through the plunger passage. Although it is unlikely, the nut "N" can cock in the plunger passage as it is driven through the plunger passage by the plunger. As will be understood from FIG. 6A, the fingers 165 are pivotally attached to the nose member 124. The upper hook-shaped portion 174 of the fingers 165 are received against the tapered portion 176 of the plunger 28 when the plunger is in the upper position, as shown. However, when the plunger 62 is driven downwardly in FIG. 6A, the fingers 165 release the nut "N" because the diameter of the shank portion is less than the tapered portion 164, such that the fingers rotate about the pivot pins 170, releasing the pierce nut "N."

FIG. 6 illustrates at improved embodiment of the nut retention mechanism based upon the improvements disclosed in the above-referenced U.S. Pat. Nos. 5,636,426. 5,953,813 and 6,263,561. However, the nut retention mechanism disclosed in FIG. 6 provides further advantages as now described.

The preferred embodiment of the nut retention mechanism shown in FIG. 6 includes opposed fingers 104 each having a hook-shaped lower end portion 106 which receives and retains the nut "N" in the plunger passage 36 as described above. The upper ends 108 of the fingers 104 are rounded or semicircular and received in slots 110 on opposed sides of the shank portion 62 of the plunger 28. As shown, the slots 110 are circular at their upper and lower ends and have a height or length greater than the diameter of the semicircular upper portions 108 of the fingers 104. The fingers 104 are thus attached to the plunger 62, but can pivot outwardly around the semicircular upper portions 108. The outer surfaces 112 of the fingers are V-shaped and the surfaces 114 adjacent the opening of the plunger passage are tapered outwardly to conform to the V-shape of the outer surfaces 112 of the fingers as described below in regard to FIGS. 7A to 7C. The fingers 104 are initially retained in the position shown in FIG. 6 by opposed ball detents 116 and the fingers are resiliently biased outwardly by opposed pins 118 received in a bore 120 in the plunger 62 by a coil spring 122, as shown. Thus, the nut "N" is securely retained in the plunger passage prior to actuation of the pierce nut installation head.

Figure 5:
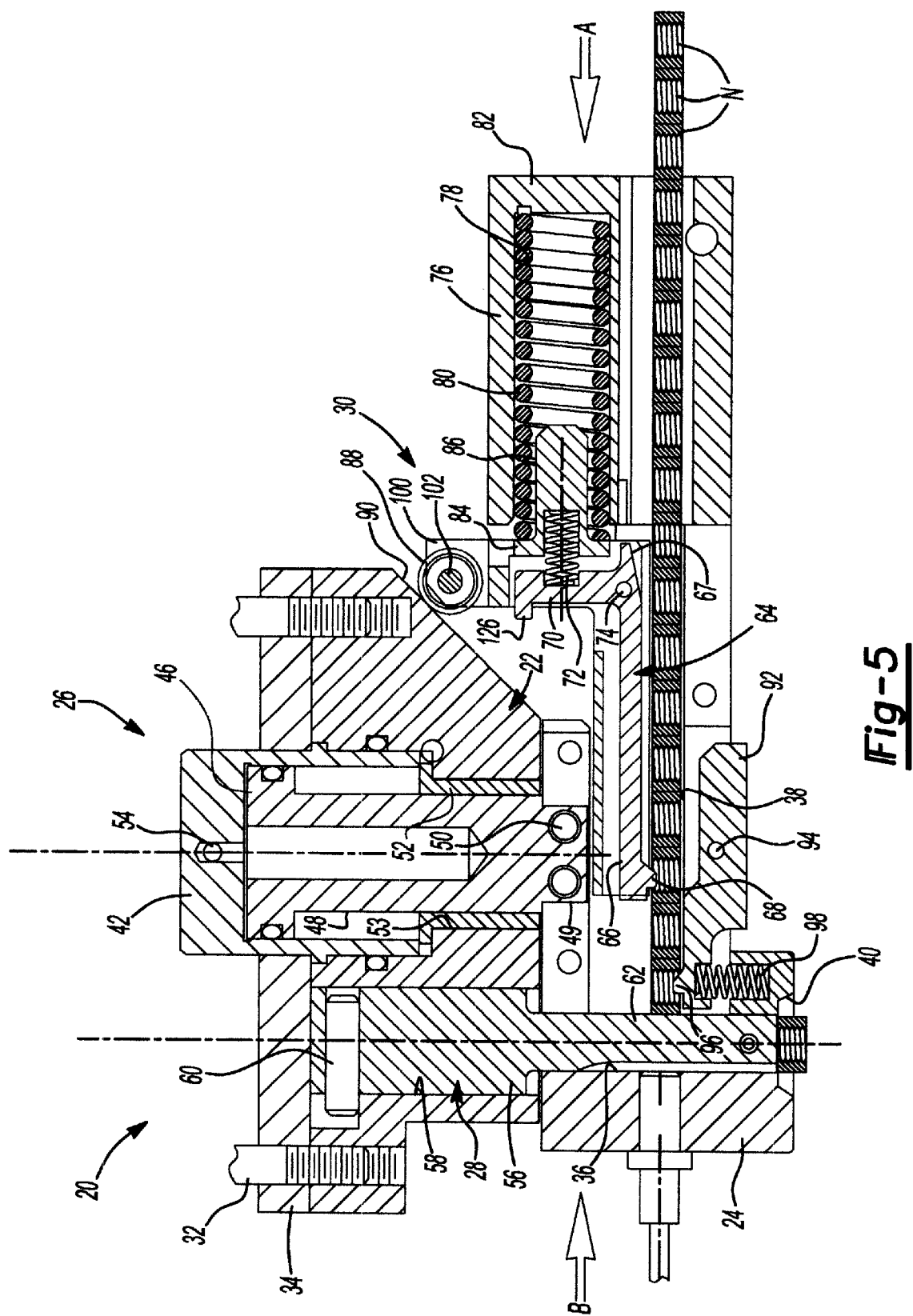
FIG. 5 is a side cross-sectional view of the fastener installation head shown in FIG. 1 in the closed position, wherein the die press is closed and a nut is installed in a panel.

As described above and in the above-referenced U.S. Patents, upon closing of the die press (not shown), the upper die shoe, to which the pierce nut installation head 20 is attached, is moved toward the lower die shoe which includes a panel and a die button until the nose member 24 engages the panel (not shown). When the nose member 24 engages the panel, the nose member 24 is driven upwardly in FIG. 1 and the shank portion 60 of the plunger 28 is then driven through the plunger passage 36, driving the nut "N" through the plunger passage 36 until the nose member 24 "bottoms" on the base member 22 as shown in FIG. 5. The nut "N" in the plunger passage is thereby installed in the panel as described above and known to those skilled in this art. During this relative movement of the base member 22 and the nose 24, the roller 88 engages the inclined cam surface 90 on the base member 22, thereby driving the roller 88 against the inclined cam surface 90 of the base member 22 and moving the feed pawl 64 to the right as can be seen by comparing FIG. 5 with FIG. 1 or away from the plunger passage 36. This movement releases the finger 68 of the feed pawl 64 from the nut bore. Then, upon opening of the die press, the spring 80 drives the slide bracket 100 and the feed pawl 64 to the left in FIG. 5, wherein the finger 68 is received in the next adjacent nut to the plunger passage 36, referred to herein as the "first" nut and the first nut is then driven into the plunger passage 36 upon opening of the die press and the pierce nut installation head 20 is thereby loaded and ready for the next installation sequence.

The nut feed mechanism 30 illustrated in FIGS. 1, 5, 8 and 9 has several advantages over the prior art. First, locating the roller 88 and the camming surface 90 in the central longitudinal axis of the pierce nut installation head 20, as shown in FIG. 3, not only simplifies the design, but also reduces the number of parts and results in a more rugged construction, less subject to failure. Second, the nut feed pawl 64 is adapted to feed the first nut "N" adjacent the plunger passage 36, rather than a nut located several nuts upstream of the plunger passage, assuring proper seriatim feeding of a nut "N" into the plunger passage 36, particularly in view of the tolerance buildup with nuts assembled by frangible connector means, such as frangible wires. In a conventional pierce nut installation head, as presently offered by the assignee of this application, the feed mechanism includes a triangular spring biased feed pawl which engages the bore of a pierce nut six to nine nuts from the plunger passage 36, depending upon the width or cut-off length of the pierce nuts and thus the normal tolerance buildup of the nut width and the spaces between adjacent nuts in a nut strip may result in feeding failure of the nuts to the plunger passage 36. Although the pierce nut installation head illustrated in U.S. Pat. No. 3,961,408 discloses a feed pawl which feeds the next adjacent nut, this feed system resulted in breakage of the linkage which drives the feed pawl forward upon closing of the press. In the feed mechanism 20 disclosed herein, the spring 80 will accommodate misfeed to the plunger passage.

Further, the dual spring arrangement, including the spring 80 permits the head to cycle without breakage. Another advantage of the pierce nut installation head of this invention is the restrictor 92, which is more rugged in construction as compared to the conventional restrictor shown in U.S. Pat. No. 3,961,408, is less subject to failure and permits easy removal of a nut strip as described below.

Figure 7C:
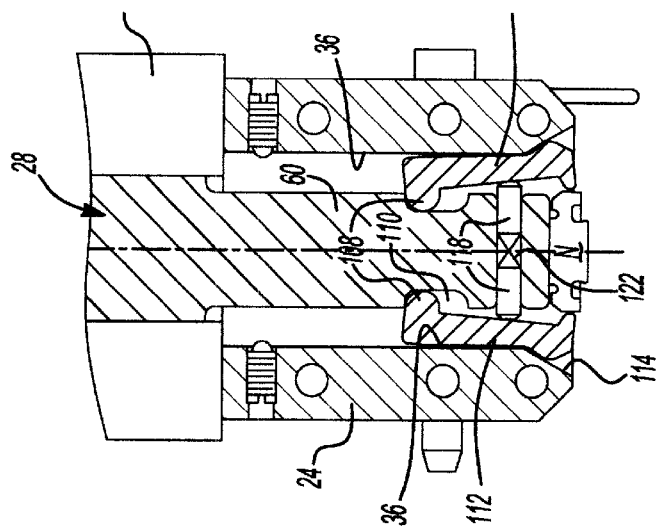
FIGS. 7A to 7C are end cross-sectional views of the nose and plunger assemblies shown in FIG. 6 illustrating the sequence of operation or installation.
Figure 7B:
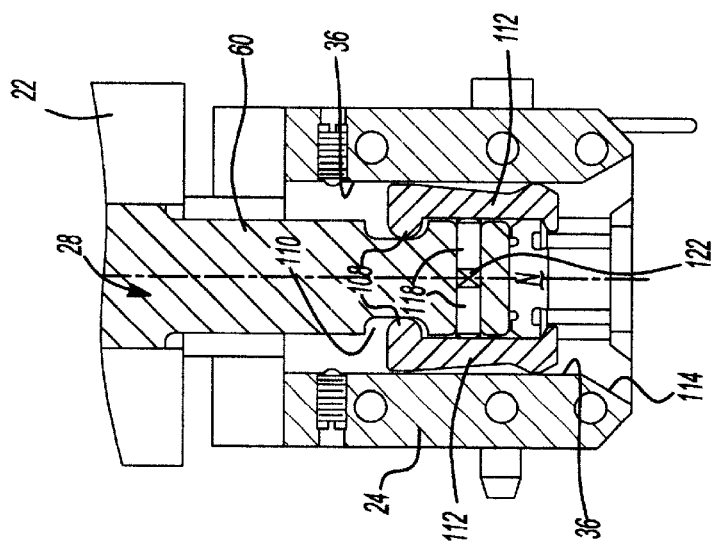
Figure 7A:
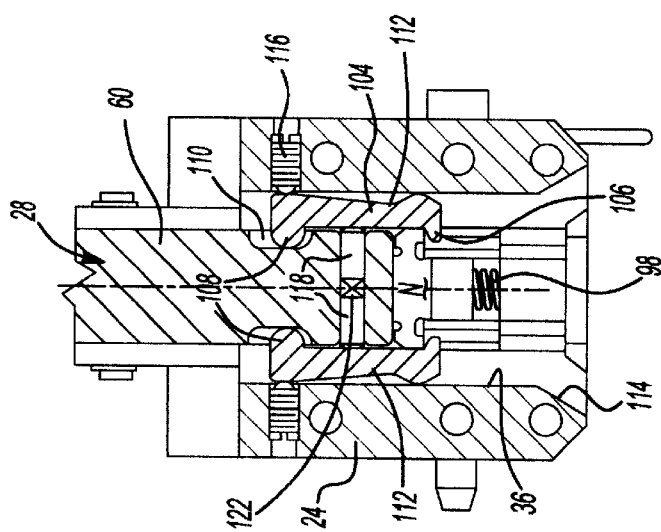

FIGS. 7A to 7C illustrate the sequence of operation of the nut retainer mechanism illustrated in FIG. 6. FIG. 7A illustrates the location of the pierce nut "N" in the plunger passage 36 when the die press is open as shown in FIG. 6, wherein the hook-shaped lower ends 106 of the fingers 104 receive and retain the nut "N" in the plunger passage 36 opposite the nut feed passage 38 in FIG. 1 as described above. FIG. 7B illustrates the retention of the nut "N" at mid-stroke of the die press, wherein the outer surfaces 112 of the fingers 104 ride against the inner surfaces of the plunger passage 36 and the hook-shaped ends 106 of the fingers 104 maintain control of the nut "N" as the nut "N" is driven through the plunger passage 36. As set forth above, this prevents cocking of the nut "N" in the plunger passage 36. Finally, as shown in FIG. 7C, the nut "N" is released at the bottom of the stroke of the plunger 28 in the plunger passage, wherein the V-shaped outer surface 112 of the fingers 104 is received in the outwardly tapered surfaces 114 at the outlet of the plunger passage, preventing further movement of the fingers 104 and the semicircular upper ends 108 of the fingers ride in the grooves or slots 110 of the plunger, releasing the nut "N" during final installation, wherein the spring 122 drives the pins 118 outwardly, rotating the fingers 104 about the semicircular upper ends 108. As shown, the fingers 104 are flush with the bottom of the nose member 24 and do not engage or mar the panel to which the nut is attached (not shown).

This nut retention mechanism of this invention thus provides the advantages of the nut retention mechanisms disclosed in the above-referenced U.S. Pat. Nos. 5,636,426, 5,953,813 and 6,263,561 in a simple, more rugged construction. That is, the nut "N" is guided and controlled throughout the stroke of the plunger 28, until the nut "N" is installed in a panel but the fingers 104 do not contact or mar the surface of the panel. However, the nut retention mechanism disclosed in this application is simpler in construction, reduces the number of parts required and is more rugged and reliable than the prior nut retention mechanisms disclosed in the above-referenced U.S. patents.

As set forth above, the pierce nut installation head 20 of this invention is simpler in design and requires fewer parts, thereby reducing cost, more rugged and reliable in design, thereby reducing failure and assuring proper installation and the pierce nut installation head presents a smaller "footprint" in the die shoe, thereby permitting the installation of pierce nuts in tight locations in a metal panel, bracket or the like. The feed mechanism 30 is specifically designed for installing pierce nut fasteners wherein the pierce nuts are interconnected by integral or separate frangible connector elements, such as disclosed in U.S. Pat. No. 3,845,860 of Multifastener Corporation. However, the pierce nut installation head disclosed may be utilized to install bulk pierce nuts by substituting a chute for the feed mechanism shown or the feed mechanism 30 may also be used as a pusher for bulk nuts.

The improved feed mechanism 30 is also more reliable and simpler to use and maintain than conventional pierce nut installation head feed mechanisms. First, the L-shaped spring biased feed pawl 66 feeds the nut adjacent the plunger passage 36 into the plunger passage as described without requiring an internal feed pawl which is connected by a linkage to the base member as disclosed in the above-referenced patent. This eliminates the problem of tolerance buildup in pierce nut strips particularly when interconnected by frangible connector elements. The pierce nut strip is simply fed into the feed mechanism and past the feed pawl 64 and the restrictor 92 without interference until the first nut of the strip is adjacent the plunger passage 36. This eliminates the requirement for pre-loading the pierce nuts in the installation head by pulling back the spring guide rod which releases the feed pawl and driving a nut into position by releasing the spring guide rod. Further, the improved pierce nut installation head is easier to unload. The pierce strip may be removed from the pierce nut installation head 20 by pushing the free end of the restrictor 92, which compresses the spring 98 and releases the finger 96 while simultaneously rotating the upper end of the leg 70 about pivot 74 counterclockwise, releasing the pierce nuts from the installation head. In the disclosed embodiment, the second leg 70 of the feed pawl 64 includes a projecting finger portion 126, providing easy access for rotation of the feed pawl about pivot pin 74 to release the finger 68 from the nut bore as described. It is particularly difficult to remove a nut strip from a conventional pierce nut installation head when the interconnected nut strip has a length less than the length of the feed passage 38 because the operator cannot reach the end of the strip to pull the strip from the installation head. The feed mechanism 30 of this invention thus makes it simple to remove the nut strip from the installation head. The connection of the shank or guidepost 48 to the nose assembly by pins 50 also reduces the number of parts, simplifies the construction and results in a more rugged design.

Having described preferred embodiments of the pierce nut installation head of this invention, it will be understood that various modifications may be made within the purview of the claims. It should also be recognized that the several improvements to the pierce nut installation head described above may be utilized individually or in combination. As set forth above, the feed mechanism 30 of this invention may include two feed pawls where the nut strip includes spaced grooves or projections as disclosed in a co-pending application of the assignee of this application, wherein the feed pawls may be pivotally supported on the sides of the slide bracket 100 and, depending on the spacing available, the feed pawls will engage a nut adjacent the plunger passage.

What is claimed is:

1. A feed mechanism for a self-attaching fastener installation apparatus, said installation apparatus including a plunger passage, a feed passage generally transverse to said plunger passage and communicating with said plunger passage, and a plunger reciprocable in said plunger passage through an intersection with said feed passage to install a self-attaching fastener received in said plunger passage from said feed passage in a panel opposite said plunger passage, said feed mechanism comprising:

a roller, a spring biased feed pawl operably connected to said roller extending into said feed passage having a finger for engaging a fastener in said feed passage adjacent said plunger passage, and said fastener installation apparatus including an inclined camming surface fixed relative to said plunger, whereby movement of said plunger through said plunger passage drives said inclined camming surface against said roller, driving said feed pawl away from said plunger passage, a spring then biasing said feed pawl toward said plunger passage upon said roller driving said finger of said feed pawl against said fastener in said feed passage adjacent said plunger passage into said plunger passage.

2. The feed mechanism for a self-attaching fastener installation apparatus as defined in claim 1, wherein said roller and said inclined camming surface are generally in the longitudinal axis of said installation apparatus.

3. The feed mechanism for a self-attaching fastener installation apparatus as defined in claim 1, wherein said feed mechanism includes a slide in said feed passage, said roller rotatably support on said slide and said feed pawl pivotally supported on said slide.

4. The feed mechanism for a self-attaching fastener installation apparatus as defined in claim 3, wherein said slide includes a base portion slidably supported in said feed passage and a generally transverse portion, said roller rotatably supported on said transverse portion of said slide.

5. The feed mechanism for a self-attaching fastener installation apparatus as defined in claim 4, wherein said feed pawl is pivotally supported on said base portion of said slide.

6. The feed mechanism for a self-attaching fastener installation apparatus as defined in claim 1, wherein said feed pawl includes an end portion having a finger adapted to be received in a bore of one of said self-attaching fasteners and a generally transverse element and a second spring biased against Said generally transverse element rotating said feed pawl about a pivotal support to receive said finger in said bore.

7. The feed mechanism for a self-attaching fastener installation apparatus as defined in claim 6, wherein said feed pawl is pivotally supported on a slide slidably supported in said feed passage.

8. The feed mechanism for a self-attaching fastener installation apparatus as defined in claim 7, wherein said generally transverse element is integral with said feed pawl and said feed pawl is pivotally supported on said slide adjacent an intersection of said generally transverse element.

9. The feed mechanism for a self-attaching fastener installation apparatus as defined in claim 8, wherein said generally transverse element is integral with said feed pawl forming an L-shaped feed pawl and said second spring rotates said L-shaped feed pawl to receive said finger in a bore of a self-attaching fastener adjacent said plunger passage.

10. The feed mechanism for a self-attaching fastener installation apparatus as defined in claim 1, wherein said feed pawl is L-shaped including a first leg portion extending into said feed passage and a generally transverse second leg portion spring biased towards said plunger passage, and said L-shaped feed pawl pivotally supported between said first and second leg portions on a bracket supporting said roller.

11. The feed mechanism for a self-attaching fastener installation apparatus as defined in claim 10, wherein said feed mechanism includes a spring operably biased against said second leg portion of said feed pawl.

12. The feed mechanism for a self-attaching fastener installation apparatus as defined in claim 11, wherein said feed mechanism includes a plunger operably engaging said second leg portion of said feed pawl.

13. The feed mechanism for a self-attaching fastener installation apparatus as defined in claim 1, wherein said feed mechanism includes a restrictor pivotally supported on said feed mechanism having a finger adapted to be received in a bore of a self-attaching fastener and a spring biasing said finger into said bore.

14. A feed mechanism for a self-attaching nut fastener installation apparatus, said installation apparatus including a plunger passage, a feed passage extending generally transverse to said plunger passage and communicating with said plunger passage, and a plunger reciprocable in said plunger passage through an intersection of said feed passage to install a self-attaching nut fastener received in said plunger passage from said feed passage in a panel opposite said plunger passage, said feed mechanism comprising:

a slide bracket in said feed passage movable toward and away from said plunger passage, a feed pawl pivotally supported on said slide brackcet having a portion extending into said feed passage including an end portion adapted to engage a self-attaching nut fastener in said feed passage adjacent said plunger passage, a spring biasing said bracket toward said plunger passage, and a roller rotatably supported on said bracket and said fastener installation apparatus including an inclined camming surface fixed relative to said plunger, opposite said roller, whereby movement of said plunger through said plunger passage drives said inclined camming surface against said roller, driving said slide bracket away from plunger passage and said spring then driving said slide bracket toward said plunger passage upon release of said roller from said inclined canning surface and said end portion of said feed pawl then driving said self-attaching fastener adjacent said plunger passage into said plunger passage.

15. The feed mechanism for a self-attaching fastener installation apparatus as defined in claim 14, wherein said feed pawl includes a generally transverse element, and a second spring biased against said generally transverse element of said feed pawl, rotating said feed pawl to engage said self-attaching fastener adjacent said plunger passage.

16. The feed mechanism for a self-attaching fastener installation apparatus as defined in claim 14, wherein said slide bracket includes a base portion slidably supported in said feed passage and a second portion extending generally perpendicular to said base portion, and said roller rotatably supported on said second portion of said bracket.

17. The feed mechanism for a self-attaching fastener installation apparatus as defined in claim 14, wherein said end portion of said feed pawl includes a finger, and said self-attaching fastener includes a bore, wherein said finger engages said bore to drive said first self-attaching fastener adjacent said plunger passage into said plunger passage.

18. The feed mechanism for a self-attaching fastener installation apparatus as defined in claim 14, wherein said feed passage defines a longitudinal axis of said fastener installation apparatus, said roller pivotally supported on said bracket in said longitudinal axis and said inclined camming surface of said fastener installation apparatus located opposite said roller generally in said longitudinal axis.

19. An installation apparatus for installing self-attaching nuts interconnected by frangible connector elements, said installation apparatus comprising:

a base member attachable to a shoe of a press having an inclined cam surface;

a plunger fixed relative to said base member and extending from said base member;

a nose member having a plunger passage telescopically receiving a free end of said plunger and a generally transverse nut feed passage intersecting said plunger passage and communicating therewith;

a shank extending generally parallel to said plunger having a first end portion attached to said nose member by removable pins and a second end portion resiliently biased towards said nose member relative to said base member; and a feed mechanism including a feed pawl extending into said feed passage having an end portion adapted to engage a self-attaching fastener adjacent said plunger passage and a roller opposite said inclined cam surface, said feed pawl spring biased towards said plunger passage and operably connected to said roller, whereby closure of said press drives said nose member against a panel located in said press, driving said plunger through said plunger passage to install a self-attaching nut in said plunger passage into a panel located opposite said plunger passage and said roller engaging said inclined cam surface to drive said pawl away from said plunger passage to receive said finger into a nut bore of a self-attaching nut adjacent said plunger passage and opening of said press releasing said roller and said feed pawl, wherein said end portion of said feed pawl engages said self-attaching fastener in said feed passage adjacent said plunger passage and said feed pawl then driving a self-attaching fastener into said plunger passage for installation in said panel upon closing of said press.

20. The installation apparatus as defined in claim 19, wherein said shank portion is generally cylindrical and said first end portion is rectangular, and said nose member having a rectangular opening receiving said first end portion of said shank and said pins extending through said first end portion and said pins are removable to release said nose member from said base member.

21. The installation apparatus as defined in claim 19, wherein said roller and said inclined camming surface are generally in a longitudinal axis of said installation apparatus.

22. The installation apparatus as defined in claim 19, wherein said feed pawl is pivotally attached to a slide member and said roller is rotatably supported on said slide member and said slide member being resiliently biased toward said plunger passage by a spring.

23. The installation apparatus as defined in claim 22, wherein said feed mechanism includes a second spring biasing a generally transverse element of said feed pawl.

24. The installation apparatus as defined in claim 23, wherein said second spring biases said feed pawl around a pivotal connection, driving said end portion into contact with said self-attaching fastener adjacent said plunger passage.

25. An installation apparatus for installing self-attaching nuts interconnected by a frangible connector element, said installation apparatus comprising:

a base member attachable to one shoe of a die press having an inclined cam surface;

a plunger fixed relative to said base member and extending from said base member;

a nose member having a plunger passage telescopically receiving a free end of said plunger and a nut feed passage intersecting said plunger passage and communicating defining a longitudinal axis of said installation apparatus;

a biasing element normally resiliently spacing said nose member from said base member, such that said plunger is reciprocated through an intersection of said plunger passage and said feed passage to install a self-attaching nut located in said plunger passage in a panel opposite said plunger passage upon closing of said press; and a feed mechanism including a bracket including a portion in said fed passage movable toward and away from said plunger passage a feed pawl pivotally supported on said bracket having a portion extending into said feed passage including an end portion adapted to engage a self-attaching nut in said feed passage adjacent said plunger passage, a spring biasing said bracket toward said plunger passage, and a roller rotatably supported on said bracket opposite said inclined cam surface of said base member in said longitudinal axis of said installation apparatus, whereby said roller engages said inclined surface of said base member upon movement of said nose member toward said base member, driving said bracket away from said plunger passage, then said biasing element driving said nose member away from said base member and said spring driving said bracket toward said plunger passage and said feed pawl engaging a self-attaching nut adjacent said plunger passage, and feeding said first self-attaching nut into said plunger passage.

26. The installation apparatus as defined in claim 25, wherein said feed pawl includes a generally transverse element, and said feed mechanism including a second spring biased against said generally transverse element of said feed pawl, rotating said feed pawl around a pivotal connection to said bracket to engage said self-attaching nut adjacent said plunger passage.

27. The installation apparatus as defined in claim 26, wherein said feed pawl includes a finger engaging said bracket, limiting rotation of said feed pawl.

28. The installation apparatus as defined in claim 25, wherein said bracket includes a base portion slidably supported in said feed passage and a generally transverse bracket portion rotatably supporting said roller.

29. The installation apparatus as defined in claim 28, wherein said feed pawl is pivotally supported on said base portion of said bracket.

30. An installation apparatus for attaching self-attaching fasteners in a panel, said installation apparatus including a plunger passage, a feed passage extending generally perpendicular to said plunger passage and communicating therewith, and a plunger having a free end reciprocating in said plunger passage through an intersection with said feed passage to install a self-attaching fastener to a panel located opposite an open end of said plunger passage, the improvement comprising:

said plunger having slots on opposed sides spaced from said free end;

fingers having a first end portion extending into said slots thereby retaining said fingers to said plunger, a V-shaped outer side surface engaging an inner side wall of said plunger passage, and a second end portion extending beyond said free end of said plunger having inwardly projecting hook-shaped ends receiving a self-attaching fastener from said feed passage, a spring biasing said fingers outwardly against said inner side wall of said plunger passage and said plunger passage having outwardly inclined surfaces adjacent said open end of said plunger passage configured to receive said V-shaped outer surface of said fingers and release said self-attaching fastener at said open end of said plunger passage.

31. The installation apparatus as defined in claim 30, wherein said spring is received in a passage extending through said plunger adjacent said free end between said first and second ends of said fingers biasing said fingers outwardly against said inner side wall of said plunger passage.

32. The installation apparatus as defined in claim 31, wherein said spring biases pins on opposed sides of said spring against said fingers.

33. The installation apparatus as defined in claim 30, wherein said first end of said fingers are generally semicircular and said slots have a length measured axially of said plunger substantially greater than the diameter of said semicircular first end of said fingers, such that said fingers move axially in said slots during release of said self-attaching nut.

34. The installation apparatus as defined in claim 33, wherein said slots include opposed generally semicircular axial end portions.

35. An installation apparatus for installing a self-attaching nut having a nut bore in a panel from a strip of self-attaching nuts interconnected by frangible connector elements, said installation apparatus comprising:

a base member adapted to be fixed to one die of a die press having an inclined surface;

a plunger fixed relative to said base member and extending therefrom;

a nose member including a plunger passage receiving said plunger and a feed passage intersecting said plunger passage;

a slide supported relative to said nose member having a roller opposite said inclined surface of said base member;

a feed pawl pivotally supported on said slide member in said feed passage of said nose member having a feed pawl finger adapted to be received in said nut bore, a first spring biasing said slide and said feed pawl toward said plunger passage and a second spring biasing said feed pawl finger into a nut bore, said first spring thereby feeding a self-attaching nut from said feed passage to said plunger passage opposite said plunger, and a nut restrictor pivotally supported on said nose member having a nut restrictor finger adapted to be received in said nut bore and a spring biasing said nut restrictor finger into a nut bore preventing withdrawal of said strip of said self-attaching nuts from said feed passage, but permitting withdrawal of said strip of self-attaching nuts from said feed passage upon rotation of said nut restrictor.

36. The installation apparatus as defined in claim 35, wherein said inclined surface of said base member and said roller of said slide are in a longitudinal axis of said installation apparatus.

37. The installation apparatus as defined in claim 35, wherein said feed pawl extends into said feed passage to receive said feed pawl finger in a bore of a self-attaching nut in said feed passage adjacent said plunger passage.

38. The installation apparatus as defined in claim 35, wherein said feed pawl includes a generally transverse element and said second spring biases said transverse element to rotate said feed pawl finger into said nut bore.

39. The installation apparatus as defined in claim 38, wherein said feed pawl and said transverse element are integral forming an L-shaped member and said second spring is biased against said generally transverse element to rotate said L-shaped member.

* * * * *